(12) United States Patent
Mishra et al.

(10) Patent No.: US 7,889,645 B2
(45) Date of Patent: Feb. 15, 2011

(54) HYBRID COORDINATION FUNCTION IMPLEMENTATION

(75) Inventors: Partho P. Mishra, Cupertino, CA (US); Sandesh Goel, Mountain View, CA (US)

(73) Assignee: Qualcomm Incorporated, San Diego, CA (US)

(*) Notice: Subject to any disclaimer, the term of this patent is extended or adjusted under 35 U.S.C. 154(b) by 996 days.

(21) Appl. No.: 10/872,120

(22) Filed: Jun. 17, 2004

(65) Prior Publication Data

US 2005/0281225 A1 Dec. 22, 2005

(51) Int. Cl.
*H04J 1/16* (2006.01)
*G06F 15/16* (2006.01)

(52) U.S. Cl. .................. 370/230; 370/235; 709/234; 709/235

(58) Field of Classification Search .......... 370/230, 370/229, 235; 709/234, 235
See application file for complete search history.

(56) References Cited

U.S. PATENT DOCUMENTS

| | | | | |
|---|---|---|---|---|
| 5,454,095 | A * | 9/1995 | Kraemer et al. ............ | 701/104 |
| 5,655,096 | A * | 8/1997 | Branigin ................... | 712/200 |
| 5,941,962 | A * | 8/1999 | Hirano ...................... | 710/53 |
| 5,956,341 | A * | 9/1999 | Galand et al. ............... | 370/412 |
| 6,160,807 | A * | 12/2000 | Zdenek et al. .............. | 370/376 |
| 6,240,095 | B1 * | 5/2001 | Good et al. ................. | 370/412 |
| 6,320,859 | B1 * | 11/2001 | Momirov .................... | 370/395.1 |
| 6,330,223 | B1 * | 12/2001 | Shimonishi ................. | 370/230 |
| 6,545,935 | B1 * | 4/2003 | Hsu et al. ................. | 365/230.05 |
| 6,754,197 | B1 * | 6/2004 | Davidson et al. ............ | 370/338 |
| 2002/0089927 | A1 * | 7/2002 | Fischer et al. .............. | 370/229 |
| 2002/0118639 | A1 * | 8/2002 | Chintada et al. ............ | 370/230 |
| 2003/0031146 | A1 * | 2/2003 | Sugaya ...................... | 370/336 |
| 2003/0133466 | A1 * | 7/2003 | Shimonishi ................. | 370/412 |
| 2003/0140179 | A1 * | 7/2003 | Wilt et al. .................. | 709/321 |
| 2003/0161340 | A1 * | 8/2003 | Sherman ..................... | 370/445 |
| 2004/0168016 | A1 * | 8/2004 | Roohparvar ................ | 711/103 |
| 2004/0184475 | A1 * | 9/2004 | Meier ......................... | 370/449 |
| 2005/0036495 | A1 * | 2/2005 | Wishneusky et al. ..... | 370/395.4 |
| 2006/0014492 | A1 * | 1/2006 | Del Prado Pavon et al. | 455/41.2 |
| 2007/0002734 | A1 * | 1/2007 | Kim et al. .................. | 370/229 |
| 2007/0058581 | A1 * | 3/2007 | Benveniste ................. | 370/328 |

OTHER PUBLICATIONS

K. Vidyasankar, "Concurrent Reading while Writing Revisited," Feb. 20, 1990, Department of Computer Science, Memorial University of Newfoundland, Distributed Computing, V4, p. 81-85.*

* cited by examiner

*Primary Examiner*—Dang T Ton
*Assistant Examiner*—Ryan C Kavleski
(74) *Attorney, Agent, or Firm*—Turocy & Watson, LLP

(57) ABSTRACT

Methods, apparatuses, and systems are presented for transmission generation at a node in a wireless network involving writing a sequence of transmission instructions to a plurality of independently accessible buffers such that each one of the sequence of transmission instructions is written to one of the plurality of independently accessible buffers, reading each one of the sequence of transmission instructions from one of the plurality of independently accessible buffers, and carrying out at least one transmission task in accordance with each transmission instruction read from one of the plurality of independently accessible buffers, wherein a read operation for reading one of the sequence of transmission instructions from one of the independently accessible buffers may overlap in time with a write operation for writing another one of the sequence of transmission instructions to another one of the independently accessible buffers.

20 Claims, 6 Drawing Sheets

HYBRID COORDINATION FUNCTION IMPLEMENTATION

BACKGROUND OF THE INVENTION

As wireless networks become increasingly popular, there is growing demand for efficient systems supporting quality of service (Qos) requirements that allow for different types of services to be provided for a variety of communications needs. In addition, such systems may need to provide both centrally-controlled as well as distributed modes of operation while continuing to support Qos requirements. The resulting increase in the complexity of these systems tends to cause increased latency and other effects that can significantly impair performance, especially as network congestion grows.

FIG. 1 depicts an illustrative wireless network 100. As shown, wireless network 100 includes an access point (AP) 102 and stations (STAs) 104 and 106. Typically, wireless networks may include numerous APs and STAs, but the simplified wireless network 100 is depicted here for illustrative purposes. Wireless network 100 represents a flexible system that supports Qos requirements while allowing for both centrally-controlled as well as distributed modes of operation. For example, wireless network 100 may allow eight different types of service, represented by eight different traffic categories (TCs), while operating using either a hybrid coordination function (HCF) or an enhanced distributed coordination function (EDCF). Generally speaking, a system operating in HCF mode may use a central node to control transmissions amongst a plurality of nodes during contention free periods (CFPs). Each node that wishes to send out a transmission must first send a request for a transmission opportunity (TXOP) to the central node. The central node allocates the channel by polling selected nodes. The central node polls each selected node by sending to it a poll transmission identifying a particular TXOP defined for a specific time and duration. A polled node may then send its queued transmission during the granted TXOP. Because there may be eight TCs, each node may maintain eight different queues of transmissions awaiting TXOPs. Correspondingly, the central node may need to keep track of information, such as queue size, relating to each of the eight queues, for each of the nodes controlled by the central node. At the same time, the central node may need to decide which nodes are to be polled and also send out the corresponding poll transmissions. The central node must accomplish all this in within tightly control time limits, since each selected node must be polled in time for it to react and send out its queued transmission within the granted TXOP. The central node itself may request and grant to itself a TXOP during which it may send its own transmissions to one or more other nodes. An AP such as AP 102 may serve as the central node. STAs such as STA 104 and 106 may represent other nodes that may send out transmissions by first requesting a TXOP from AP 102 and then transmitting during allocated TXOPs when polled by AP 102.

The complex and time sensitive processing and transmission operations that must be performed by a node in a wireless network such as wireless network 100 present a formidable challenge in hardware and software design. For example, any latency in the processing and sending of polls may significantly undermine performance by creating delays in the transmission of polls, which can in turn increase the likelihood that polled nodes may not have sufficient time to perform their transmission within the allotted TXOPs. This may lead to wasted TXOPs that degrade the overall throughput performance of the wireless network, particularly when the wireless network experiences congestion. Thus, there is a urgent need for improving the latency characteristics of nodes that participate in wireless networks as complexity and congestion increases.

BRIEF SUMMARY OF THE INVENTION

The present invention relates to methods, apparatuses, and systems for transmission generation at a node in a wireless network involving writing a sequence of transmission instructions to a plurality of independently accessible buffers such that each one of the sequence of transmission instructions is written to one of the plurality of independently accessible buffers, reading each one of the sequence of transmission instructions from one of the plurality of independently accessible buffers, and carrying out at least one transmission task in accordance with each transmission instruction read from one of the plurality of independently accessible buffers, wherein a read operation for reading one of the sequence of transmission instructions from one of the independently accessible buffers may overlap in time with a write operation for writing another one of the sequence of transmission instructions to another one of the independently accessible buffers.

The plurality of independently accessible buffers may consist of a first buffer and a second buffer that are alternately accessed to perform the writing and reading steps. In one embodiment of the invention, consecutive transmission instructions from the sequence of transmission instructions are written to different ones of the independently accessible buffers. In another embodiment of the invention, consecutive sets of transmission instructions from the sequence of transmission instructions are written to different ones of the independently accessible buffers.

In addition, feedback information may be generated relating to the at least one transmission task associated with one of the sequence of transmission instructions. The feedback information may be taken into account in generating at least one additional transmission instruction. The generated feedback information may be written to a field within a corresponding transmission instruction in one of the plurality of independently accessible buffers.

According to one embodiment of the invention, the writing step may be performed by a higher level module responsible for scheduling transmissions, and the reading and carrying out steps are performed by a lower level module responsible for generating transmissions scheduled by the higher level module. At least one of the sequence of transmission instructions may relate to a poll transmission to be sent from the node to grant a transmission opportunity (TXOP) to another node. Specifically, the node may be a central node for managing channel access, and the other node may be a remote node that is allowed to send a data transmission during the granted TXOP. At least one of the sequence of transmission instructions may relate to a data transmission to be sent from the node. Also, the node may be capable of operating under a hybrid coordination function (HCF).

DETAILED DESCRIPTION OF THE INVENTION

Figure 1:
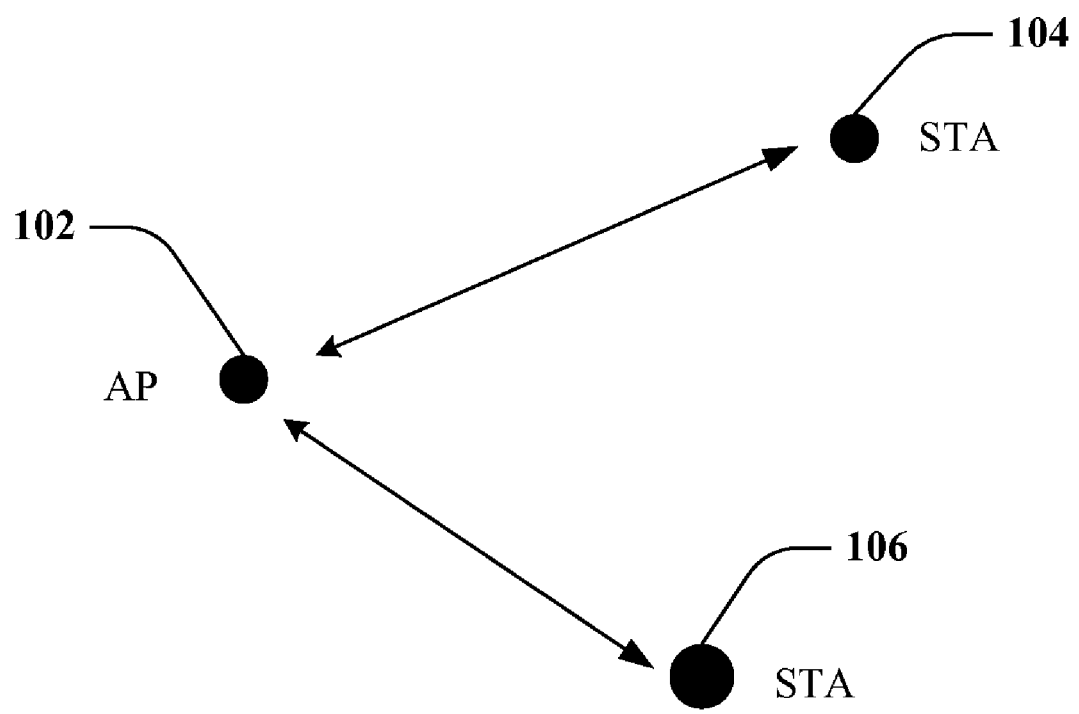
FIG. 1 depicts an illustrative wireless network.
Figure 2:
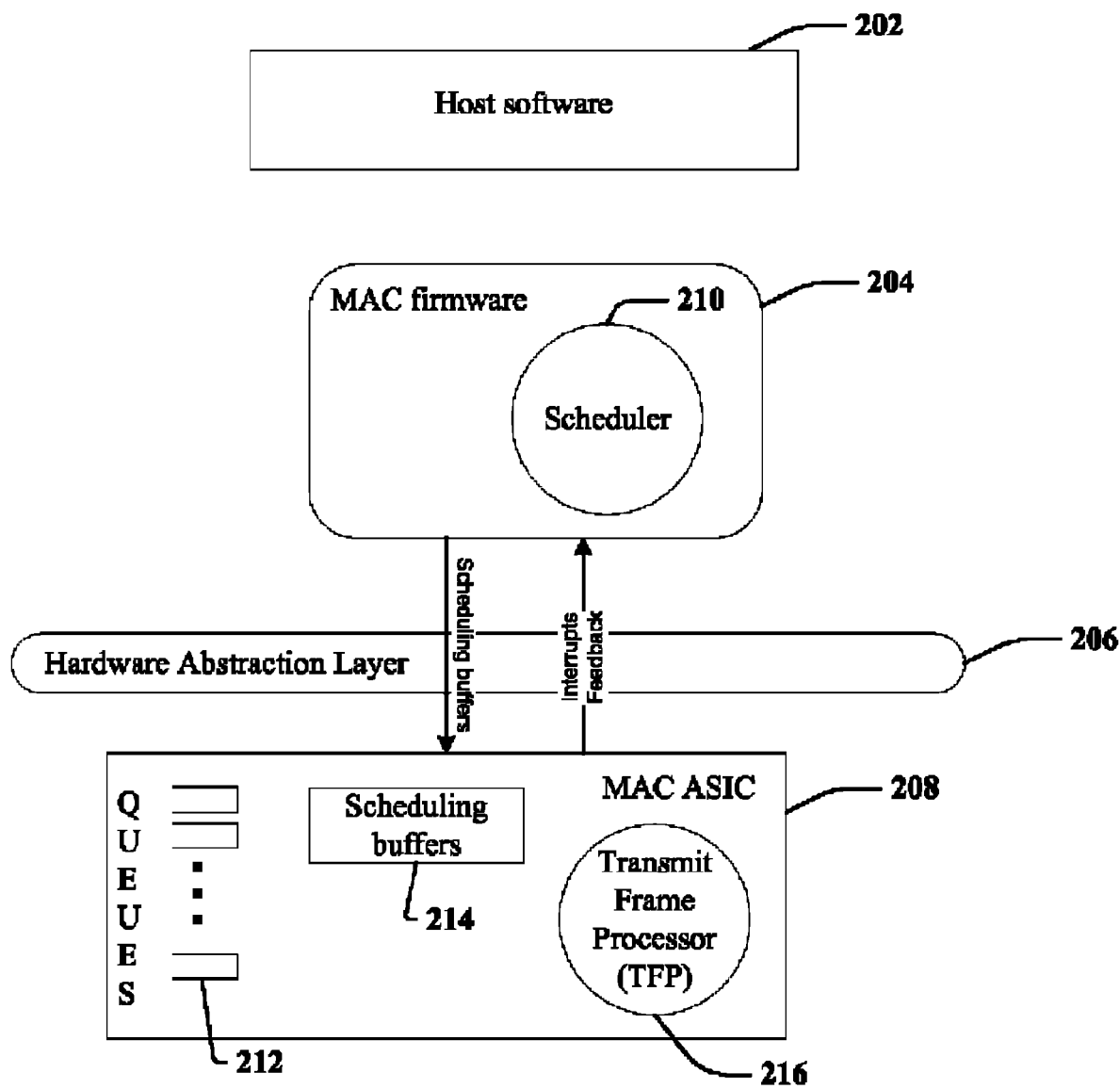
FIG. 2 is a block diagram of the internal structure 200 of a node in a wireless network in accordance with one embodiment of the present invention.

FIG. 2 is a block diagram of the internal structure 200 of a node in a wireless network in accordance with one embodiment of the present invention. The node may be an AP such as AP 102 or an STA such as STA 104 or STA 106. Structure 200 includes host software 202, media access control (MAC) firmware 204, hardware abstraction layer 206, and MAC application specific integrated circuit (ASIC) 208. Firmware structure 200 may be implemented using one or more processors units which execute instructions to carry out operations associated with various functional modules that are a part of structure 200. As shown, MAC firmware 204 comprises scheduling module 210. MAC ASIC 208 includes transmit queues 212, scheduling buffers 214, and a Transmit Frame Processor (TFP) module 216. As shown in FIG. 2, scheduling module 210 is responsible for driving the TFP 216 module inside the MAC hardware by issuing timely instructions, as discussed in further detail below. Hardware abstraction layer 206 interfaces with hardware layer modules, such as MAC ASIC 208. This may be done through the use of a hardware application program interface (API).

The effectiveness of the communication between scheduling module 210 and MAC ASIC 208 may have a direct impact on the throughput of wireless transmissions. Here, scheduling module 210 is responsible for scheduling transmissions of the node in which scheduling module 210 resides. Once scheduling module 210 decides that a particular transmission is to be sent, it communicates a corresponding transmission instruction to MAC ASIC 208, instructing MAC ASIC 208 to generate the actual transmission. Here, a transmission instruction broadly refers to a portion of data used that can be used to communicate information regarding one or more operations relating to transmission. If the node happens to be an AP operating as a central node in HCF mode, for instance, transmissions sent from the node may include poll transmissions. As discussed previously, an AP acting as a central node allocates the channel by polling selected nodes. The central node polls each selected node by sending to it a poll transmission identifying a particular TXOP defined for a specific time and duration. In addition, the central node may send data transmissions. The AP acting as the central node may thus need to send both poll and data transmissions. According to the present embodiment of the invention, scheduling module 210 is responsible for scheduling such transmissions by communicating a sequence of instructions relating to the transmissions to MAC ASIC 208, and MAC ASIC 208 is responsible for generating the actual transmissions. Thus, efficient communication of the transmission instructions from scheduling module 210 to MAC ASIC 208 allows MAC ASIC 208 to generate the transmissions in a timely manner, which facilitates proper operation of the wireless system.

Figure 3:
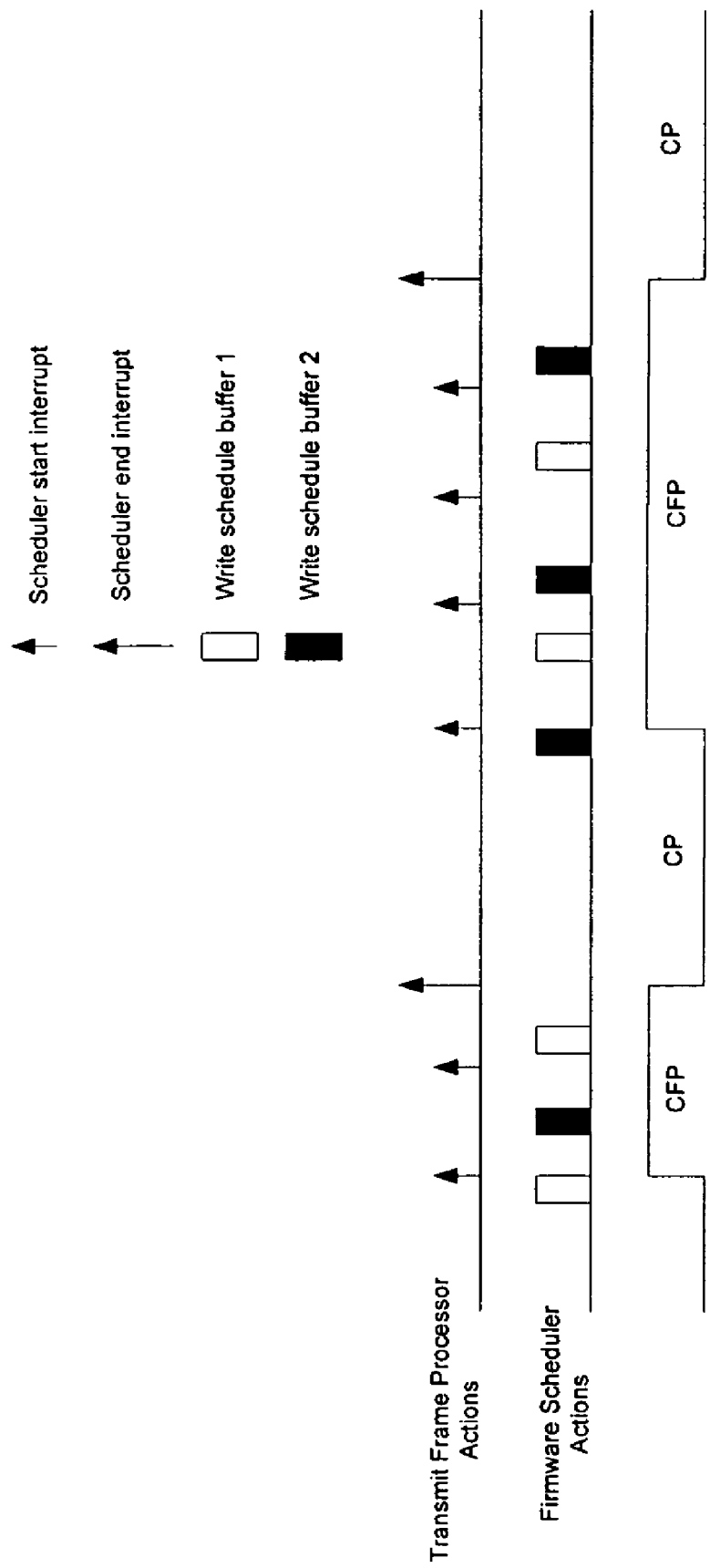
FIG. 3 is a timing diagram illustrating the timing features of signals and conditions relevant to operation of the AP acting as a the central node in HCF mode, according to one embodiment of the present invention.

FIG. 3 is a timing diagram illustrating the timing features of signals and conditions relevant to operation of the AP acting as a the central node in HCF mode, according to one embodiment of the present invention. As shown in the figure, higher level processing generates transmission instructions for the lower level processing to reflect one or more transmission schedules. Here, issuance of a set of transmission instructions by the higher level processing triggers the start of a contention free period (CFP). A set of transmission instructions may contain one transmission instruction or more than one transmission instruction. The lower level processing responds by carry out the transmission instructions. The lower level processing may also asynchronously generate scheduling interrupts that are sent to higher level processing. Thus, generation of the scheduling interrupts are not necessarily synchronized to the generation of the transmission instructions by the higher level processing. For example, lower level processing may send scheduling start interrupts to higher level processing each time lower level processing initiates execution of a new set of transmission instructions. In response to each scheduling start interrupt, higher level processing may provide the next set of scheduling instructions to the lower level processing corresponding to transmissions to be carried out by the lower level processing after it is done executing the current set of instructions. For instance, TFP module 216 may generate the scheduling start interrupts, which may be sent to scheduler module 210. Scheduler module 210 may thus "wake up" from its other operations upon every scheduling start interrupt to generate a set of scheduling instructions corresponding to transmissions that are to be sent. These scheduling instructions are communicated to TFP module 216, which responds by generating the indicated transmissions.

Depending on traffic arrival, presence of legacy nodes in the network and other scheduling constraints, scheduler module 210 may decide to terminate the CFP, at which point it may stop writing any further instructions. TFP module 216 may terminate the CFP when it does not receive any new instructions from scheduler module 210, and generate a scheduler end interrupt to indicate to scheduler module 210 that the CFP has indeed been terminated. This may be followed by a contention period (CP), during which all the nodes in the network are free to transmit following the transmission rules of contention-based protocol, such as a distributed coordination function (DCF) protocol, until the scheduler module decides to initiate another CFP by writing a fresh set of instructions in a scheduling buffer. The entire cycle may then repeat.

Figure 4:
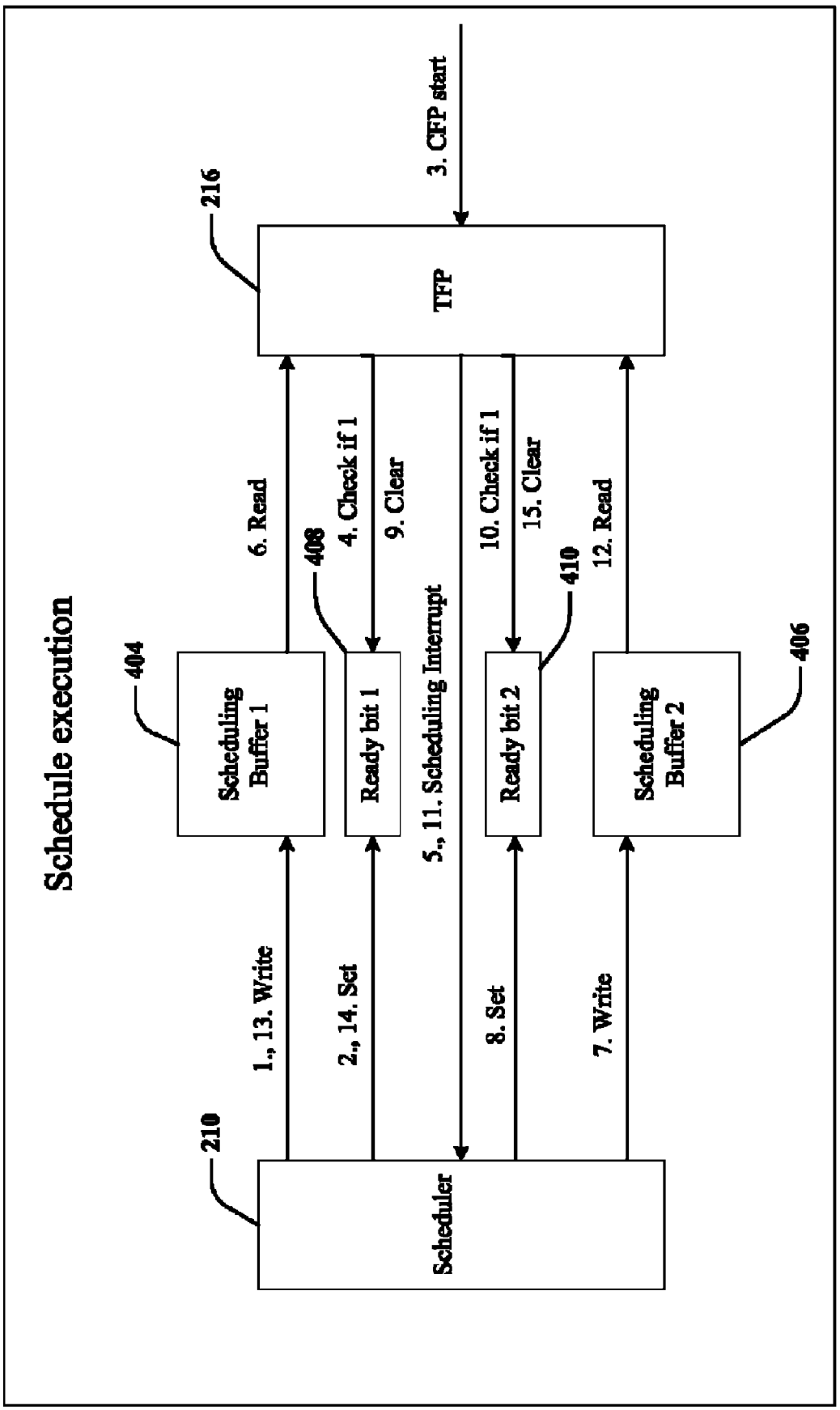
FIG. 4 is a block diagram of two independently accessible buffers used for communicating a sequence of transmission instructions in accordance with one embodiment of the present invention.

FIG. 4 is a block diagram of two independently accessible buffers used for communicating a sequence of transmission instructions in accordance with one embodiment of the present invention. As shown in this figure, scheduler module 210 communicates a sequence of transmission instructions to TFP module 216, using two independently accessible buffers illustrated here as scheduling buffers 404 and 406.

According to the present embodiment of the invention, scheduler module 210 communicates a sequence of transmit instructions to TFP module 216 by writing the transmission instructions to scheduling buffers 404 and 406 in a "ping-pong" fashion. That is, scheduler module 210 may write a first transmission instruction to scheduling buffer 404, then write a second transmission instruction to scheduling buffer 406, then write a third transmission instruction to scheduling buffer 404, and then write a fourth transmission instruction to scheduling buffer 406, and so on. By alternately accessing the two scheduling buffers to perform write operations, the two scheduling buffers are made available for read operations in an efficient manner. For example, after the first transmission instruction is written to scheduling buffer 404, scheduling buffer 404 is available so that TFP module 216 may read the first transmission instruction from scheduling buffer 404.

While TFP module 216 is accessing scheduling buffer 404 to read the first transmission instruction, scheduler module 210 may write a second transmission instruction to scheduling buffer 406. Scheduler module 210 may perform this next write operation with scheduling buffer 406 without waiting for TFP module 216 to finish performing its read operation with scheduling buffer 404. Similarly, when TFP module 216 is accessing scheduling buffer 406 to read the second transmission instructions, scheduler module 210 may write a third transmission instruction to scheduling buffer 404, without waiting for TFP module 216 to finish performing its read operation with scheduling buffer 406.

FIG. 4 also illustrates in further detail an example process of writing and reading transmission instructions to and from scheduling buffers 404 and 406. As shown in the figure, scheduler module 210 writes a transmission instruction to scheduling buffer 404 and sets ready bit 408 associated with scheduling buffer 404, indicating that an instruction has been written to and may be read from the buffer. Meanwhile, a contention free period (CFP) may have started, and TFP module 216 checks ready bit 408 to determine whether scheduling buffer 404 may be read. If ready bit 408 is set, TFP module 216 may proceed to read from scheduling buffer 404. If ready bit 408 is not set, TFP module 216 may continue to check ready bit 408 to determine if it is set. Meanwhile, TFP module 216 may send a scheduling interrupt to prompt scheduler module 210 to generate a new set of transmission instructions. When TFP module determines that ready bit 408 is set, TFP module may then read a transmission instruction from scheduling buffer 404. In the mean time, scheduler module 210 may write the next transmission instruction to scheduling buffer 406. Scheduling buffer 404 and 406 are independently accessible buffers. While one instruction is being read from scheduling buffer 404, another instruction may be written to scheduling buffer 406. Thus, scheduler module 210 writes the next transmission instruction to scheduling buffer 406 and sets ready bit 410 associated with scheduling buffer 406, indicating that an instruction has been written to and may be read from the buffer. At the same time, TFP module may have completed reading the previous transmission instruction from scheduling buffer 404 and cleared ready bit 408. TFP module 216 may also be checking ready bit 410 to determine whether scheduling buffer 406 may be read. If ready bit 410 is set, TFP module 216 may proceed to read from scheduling buffer 406. If ready bit 410 is not set, TFP module 216 may continue to check ready bit 410 to determine if it is set. Meanwhile, TFP module 216 may send another scheduling interrupt to prompt scheduler module 210 to generate yet another new set of transmission instructions. When TFP module determines that ready bit 410 is set, TFP module may then read a transmission instruction from scheduling buffer 406. In the mean time, scheduler module 210 may write the next transmission instruction to scheduling buffer 404. Read and write operations continue in the manner described above to allow further transmission instructions to be communicated from scheduler module 210 to TFP module 216 via the independently accessible scheduler buffers 404 and 406. The present embodiment thus provides an example of how a read operation for reading a transmission instruction from one independently accessible buffer may overlap in time with a write operation for writing a transmission instruction to another independently accessible buffer.

In accordance with the present embodiment of the invention, one transmission instruction is written to a particular scheduling buffer at one time. For example, even if scheduler module 210 has more than one transmission instruction to communicate to TFP module 216, scheduler module 210 may write only one of the available transmission instructions to scheduling buffer 404, then write the next transmission instruction to scheduling buffer 406. In this manner, scheduling buffer 404 is made available to be read by TFP module 212 as soon as the first transmission instruction is written, without waiting for additional transmission instructions to be written. In other embodiments, however, more than one transmission instruction may be written to a particular scheduling buffer at one time. For example, a set of more than one transmission instructions may be written to scheduling buffer 404, followed by a set of more than one transmission instructions written to scheduling buffer 406. Each set of transmission instructions may be limited to a certain number of transmission instructions. Similarly, in the embodiment shown in FIG. 4, one transmission instruction is read from a particular scheduling buffer at one time. In other embodiments, TFP module 216 may read more than one transmission instruction from a particular scheduling buffer at one time. For example, TFP module 216 may read a set of more than one transmission instructions from scheduling buffer 404, then read a set of more than one transmission instructions from scheduling buffer 406. Here, a set of transmission instructions may be written to one scheduling buffer while another set of transmission instructions may be read from another scheduling buffer.

Figure 5:
FIG. 5 provides illustrative details of the structure that may be implemented for the independently accessible buffers shown in FIG. 4.

FIG. 5 provides illustrative details of the structure that may be implemented for independently accessible scheduling buffers 404 and 406 shown in FIG. 4. Here, scheduling buffers 404 and 406 each includes a number of counters, pointers, and/or other modifiable parameters relevant to each scheduling buffer. For example, scheduling buffer 404 is shown to include a total expiration time for the schedule (TEXP) 502 that is two bytes long, a total count of the instructions in the scheduling buffer (TOT) 504 that is one byte long, and a pointer to the current instruction being executed (CUR) 506 that is one byte long. TEXP 502 is the maximum time that the TFP is allowed to spend executing the instructions in the given scheduling buffer. Even though the scheduler buffer contains a finite number of instructions, the total time taken to execute those instructions can theoretically be unbounded, and in practice much larger than anticipated, because the TFP may have to defer due to medium busy events. Specifying TEXP 502 allows the scheduler to ensure that the TFP returns the control to the scheduler within a bounded amount of time, after which the scheduler can recompute the appropriate schedule. This allows the scheduler to handle requirements imposed by bursty and latency sensitive traffic as well as maximum medium occupancy time constraints, such as those that may be imposed by regulatory domains. By taking into account TEXP 502, the scheduler may also control relative durations of contention free periods (CFP) and contention periods (CP) by stopping and resuming writes of transmission instructions to the scheduling buffers. Scheduling buffer 406 is shown to include a similar set of modifiable parameters.

Each of the scheduling buffers 404 and 406 also includes a number of entries for storing transmission instructions. Here, each buffer includes 16 entries. However, the number of entries may or may not be fixed at these particular values, depending on the implementation. As illustrated in FIG. 5, the sixteen entries of each scheduling buffer are shown to correspond to "Instruction 1" through "Instruction 16." These labels merely indicate that sixteen separate transmission instructions may be stored in the sixteen entries of each scheduling buffer. As discussed above, consecutive transmission instructions generated by scheduler module 210 may be alternately written to the two buffers, as opposed to written to the same buffer. Thus, scheduling module 202 may write a sequence of consecutive transmission instructions such that the first transmission instruction is written to scheduling buffer 404, the second transmission instruction is written to scheduling buffer 406, the third transmission instruction is written to scheduling buffer 404, the fourth transmission instruction is written to scheduling buffer 406, and so on. In other embodiments, more than one transmission instruction may be written to a particular scheduling buffer at one time, as previously mentioned.

While embodiments of the invention as shown in FIGS. 4 and 5 utilize only two independently accessible buffers, the invention is not necessarily so limited. In other embodiments, more than two buffers may be utilized, and transmission instructions may be written to the buffers in a round-robin fashion, or in some other fashion, to allow transmission instructions to be written in a distributed manner and facilitate efficient reading of the transmission instructions by the module responsible for generating the transmissions. Similarly, the instructions may be read from the multiple buffers in a round-robin fashion or other fashion.

Furthermore, scheduler module 210 may also define a maximum CFP duration. This may be communicated to the TFP module via a hardware API. TFP module 216 would ensure that a CFP does not exceeds this maximum duration. Within this maximum duration, TFP module 216 may keep executing schedules being provided by the scheduler module, but TFP module 216 terminates the CFP as soon as this duration is exceeded. This ensures that the CFP period can be kept bounded if so desired, to accommodate the maximum medium occupancy time constraints, such as those that may be imposed by regulatory domains. This maximum CFP duration facilitates precise synchronization of the termination of the CFP to accommodate such time constraints.

Figure 6:
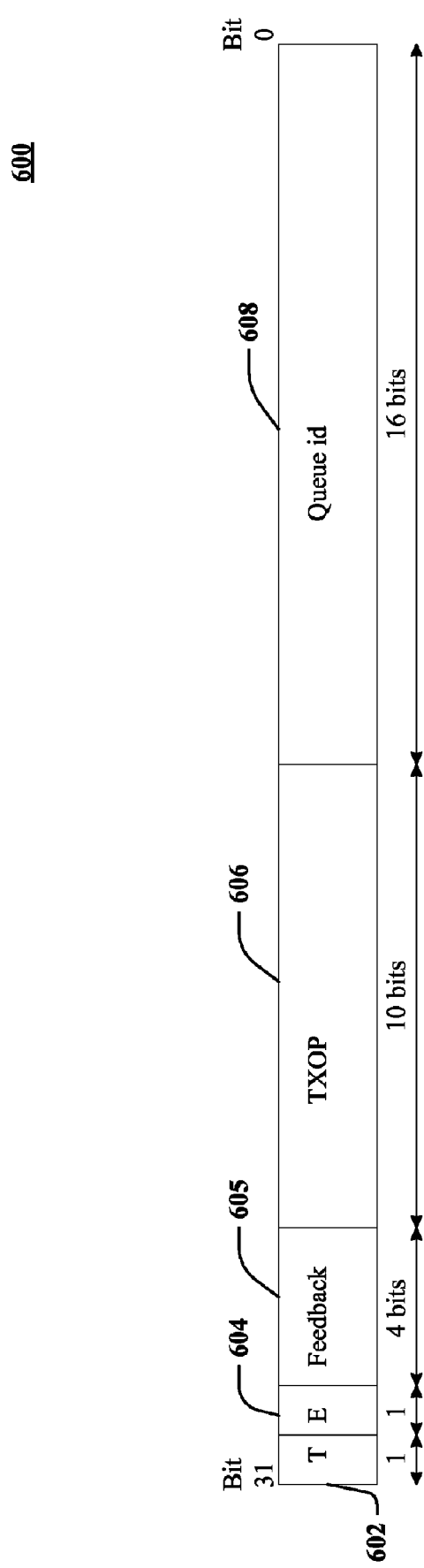
FIG. 6 illustrates further details of a transmission instruction that may be communicated via scheduling buffers in accordance with one embodiment of the present invention.

FIG. 6 illustrates further details of a transmission instruction 600 that may be communicated via scheduling buffers 404 and 406 in accordance with one embodiment of the present invention. As shown in the figure, transmission instruction 600 is 32 bits wide, with bits numbered from bit 0 to bit 31. The particular width of 32 bits is selected in the present embodiment of the invention, but other widths may be implemented. Transmission instruction 600 may include a number of fields occupying different portions of the instruction. As shown in the figure, these fields may include a type (T) field 602 that is 1 bit wide, an executed (E) field 604 that is 1 bit wide, a feedback field 605 that is 4 bits wide, a transmit opportunity (TXOP) field 606 that is 10 bits wide, and a Queue id field 608 that is 16 bits wide.

Type field 602 indicates whether the transmission instruction relates to a poll transmission or a data transmission. As discussed previously, the node in which transmission instruction 600 is implemented may be an AP operating as a central node in a wireless network during HCF mode. As such, transmissions of the AP may include poll transmissions utilized to poll other nodes, to allow those other nodes to send out their queued transmissions during specific TXOPs. Thus, an instruction indicated by type field 602 as a poll instruction generally corresponds to a poll transmission to be sent from an AP to give a TXOP to another node. Transmissions of the AP may also include data transmissions from the AP to other nodes. Further, transmissions of an STA may include data transmissions from the STA to other nodes. Thus, an instruction indicated by type field 602 as a data instruction generally corresponds to a data transmission to be sent from an AP or an STA.

E field 604 is used to indicate whether the particular instruction has been executed or not. This can be used by scheduler module 210 to accurately account for the usage of medium by different queues, and based on that usage generate future schedules.

The TFP feedback field 605 is used to provide feedback information from TFP module 216 to scheduler module 210. According to one embodiment of the present invention, once an instruction is communicated from a higher level processing module to a lower level processing module, instructing the lower level processing module to generate a particular transmission, the lower level module may provide feedback information to the higher level module regarding the progress or status in carrying out the corresponding transmission task(s). For example, in the present embodiment of the invention, the scheduler module 210 represents a higher level module that may communicate a transmission instruction to TFP module 216, which represents a lower level module, to instruct the TFP module 216 to carry out a particular transmission. In generating and sending out the transmission, TFP module may obtain feedback information and indicate such feedback information in the TFP feedback sub-field of the transmission instruction as illustrated in the following examples.

If the instruction type is data,
A feedback value of 0 may indicate that the TXOP was too short for first fragment and therefore nothing could be transmitted. This feedback could be incorporated by the scheduler module by assigning a larger TXOP to that queue in future schedules, since currently assigned TXOP is not large enough to fit the packet at the head of the queue
A feedback value of 1 may indicate that the remaining TXOP was too short for last fragment and therefore some data is remaining in the queue. This feedback could be incorporated by the scheduler module by continuing to grant TXOP to this queue in future schedules
A feedback value of 2 may indicate that the queue was empty and therefore nothing was transmitted. This feedback could be incorporated by the scheduler module by discontinuing the assignment of TXOP to this queue in future schedules
A feedback value of 3 may indicate that the CFP was terminated because maximum CFP duration was exceeded and hence the schedule was terminated. This feedback could be incorporated by the scheduler module by restarting the CFP at an appropriate future time.
If the instruction type is poll,
A feedback value of 0 may indicate that no response to the poll was received. This can be incorporate by the scheduler module by trying to determine if the peer node has wandered away and take appropriate action
A feedback value of 1 may indicate that null data was received in response to poll, indicating that the peer node does not have any data to send. This could be incorporated by the scheduler module by discontinuing the assignment of polling opportunities to this peer node.
A feedback value of 2 may indicate that data reception stopped because TXOP expired, indicating that the peer node has more data to send. This could be incorporated by the scheduler module by continuing to assign polling opportunities to the peer node in future schedules.

Referring again to FIG. 6, TXOP field 606, which is ten bits wide in the present embodiment of the invention, is used to specify the time limit of the transmit opportunity (TXOP) in units of 16 microseconds. Thus, just as an example, a value of 200 in TXOP field 606 specifies that the TXOP has a time limit of 3200 microseconds. Each transmit instruction corresponding to a poll transmission thus specifies the time limit of an associated TXOP during which the polled node must sent out its queued data transmission. According to one embodiment of the present invention, TXOP 606 may also be used to indicate the unused TXOP upon completion of the transmission specified in the transmission instruction. For example, TFP 402 may receive a transmission instruction for a poll transmission, send out the specified poll transmission, and write in TXOP 606 field of the transmission instruction the amount of time left in the TXOP after sending out the poll transmission, in units of 16 micro seconds. This may help the scheduler module to keep a precise account of the usage of medium access by the various queues and nodes, which may be used to generate future schedules.

Finally, identification field 608, which is 16 bits wide in the present embodiment of the invention, is used to specify either a STA id or a queue id, depending whether transmission instruction 600 corresponds to a poll transmission (as indicated a value of "1" in type field 602) or a data transmission (as indicated by a value of "0" in type field 602). If transmission instruction 600 corresponds to a poll transmission to be sent out from the present node, identification field 608 is used to specify the STA id of the polled node that is to receive the polling transmission. According to the present embodiment of the invention, the polling instruction specifies the polled node, but not necessarily which one of the eight queues of data in the polled node from which the polled node will transmit its data. Thus, the polled node must decide on its own from which of its eight nodes it should retrieve data for sending out during its granted TXOP. If transmission instruction 600 corresponds to a data transmission to be sent out from the present node, identification field 608 is used to specify the queue id of the queue within the present node from which the present node will transmit data.

By utilizing independently accessible buffers such as buffers 404 and 406, transmission instruction such as transmission instruction 600 illustrated in FIG. 6 may be communicated from a higher level module such as scheduler module 210 to a lower level module such as TFP module 216. In addition, feedback information may also be provided from the lower level module to the higher level module to facilitate more effective transmission operations. The specific fields shown in FIG. 6 are presented here for illustrative purposes. Variations of these fields, as well as other fields, may be included as part of a transmission instruction in accordance with the present invention.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method comprising:
  alternating writing at least one transmission instruction of transmission instructions related to one or more wireless transmissions from a node to a first buffer of the node while reading at least one transmission instruction of the transmission instructions from a second buffer of the node and writing at least one transmission instruction of the transmission instructions to the second buffer while reading at least one transmission instruction of the transmissions instructions from the first buffer;
  writing feedback information related to the alternating to a field within a transmission instruction of the transmissions instructions to which at least part of the feedback information applies; and
  modifying one or more parameters associated with at least one of the first buffer or the second buffer based on the alternating, wherein at least one of the one or more parameters indicates a maximum time for executing transmission instructions included in the at least one of the first buffer or the second buffer.

2. The method of claim 1, further comprising:
  controlling duration of at least one of a contention free period (CFP) or a contention period (CP) by halting and resuming the alternating.

3. The method of claim 1, further comprising:
  sending a poll transmission from the node based on at least one of the transmission instructions; and
  granting a transmission opportunity (TXOP) to an other node based on the poll transmission.

4. The method of claim 3, further comprising:
  managing channel access associated with nodes; and
  controlling transmission of the nodes via the managing;
  wherein the node is a central node and the other node is configured to transmit data during the granting based on the controlling.

5. The method of claim 1, further comprising:
  generating a wireless transmission from the node comprising a data transmission based on at least one transmission instruction of the transmission instructions.

6. The method of claim 1, further comprising:
  operating the node under a hybrid coordination function (HCF).

7. The method of claim 1, further comprising:
  creating at least one transmission instruction based on the feedback information.

8. The method of claim 1, wherein the modifying includes modifying the one or more parameters associated with the at least one of the first buffer or the second buffer based on the alternating, wherein the at least one of the one or more parameters indicates a number of transmission instructions included in the at least one of the first buffer or the second buffer.

9. An apparatus comprising:
  means for alternating a means for writing transmission instructions to buffers and a means for reading the transmission instructions from the buffers in a round-robin manner to affect wireless transfer from a node based on the transmission instructions;
  means for writing feedback information to a field within a corresponding transmission instruction of the transmission instructions, the feedback information output from the means for alternating; and
  means for updating at least one parameter associated with at least one buffer of the buffers based on the means for alternating, wherein the at least one parameter indicates a maximum time for executing transmission instructions included in the at least one buffer.

10. An apparatus comprising:
  a higher level module coupled to at least two buffers, wherein the higher level module is configured to:
    write transmission instructions to the at least two buffers in a first round-robin manner; and
    control duration of at least one of a contention free period (CFP) or a contention period (CP) by stopping and resuming at least one write of a transmission instruction of the transmission instructions; and
  a lower level module coupled to the at least two buffers, wherein the lower level module is configured to:

read the transmission instructions from the at least two buffers in a second round-robin manner; and execute one or more transmission instructions read from a buffer of the at least two buffers based on a maximum instruction execution time associated with the buffer.

11. The apparatus of claim 10, wherein:

the lower level module is configured to generate feedback information based on the transmission instructions read from the at least two buffers; and the higher level module is configured to create at least one transmission instruction based on the feedback information.

12. The apparatus of claim 11, wherein the lower level module is configured to write the feedback information to a field within a corresponding transmission instruction.

13. The apparatus of claim 10, wherein the lower module is configured to asynchronously send an interrupt to the higher level module to indicate at least one of a start of execution of a transmission instruction or an end of execution of the transmission instruction.

14. The apparatus of claim 10, wherein the lower level module is configured to execute a transmission instruction within the CFP.

15. The apparatus of claim 10, wherein the lower level module is configured to wirelessly transmit a poll transmission to a node based on a transmission instruction, wherein the poll transmission grants a transmission opportunity (TXOP) to the node.

16. The apparatus of claim 15, wherein the higher level module is configured to control a data transmission of the node based on the TXOP.

17. The apparatus of claim 10, wherein the higher level module and the lower level module are configured to operate under a hybrid coordination function (HCF).

18. The apparatus of claim 9, further comprising:

means for controlling duration of at least one of a contention free period (CFP) or a contention period (CP) based on a means for stopping and resuming the means for writing transmission instructions.

19. The apparatus of claim 9, further comprising:

means for updating the field within the corresponding transmission instruction based on the means for alternating, the field indicates whether the transmission instruction was executed.

20. The apparatus of claim 9, wherein the at least one parameter indicates a number of transmission instructions included in the at least one buffer.

* * * * *